Oct. 15, 1968 SUKEHIRO ITO ET AL 3,406,345

RADIO RECEIVER UTILIZING IF, LOCAL AND NOISE SIGNALS FOR PROVIDING NEGATIVE FEEDBACK VOLTAGES TO CONTROL GAIN AND FREQUENCY

Filed March 10, 1964 2 Sheets-Sheet 1

By

Attorney

By [signature]
Attorney

United States Patent Office 3,406,345

Patented Oct. 15, 1968

3,406,345

RADIO RECEIVER UTILIZING IF, LOCAL AND NOISE SIGNALS FOR PROVIDING NEGATIVE FEEDBACK VOLTAGES TO CONTROL GAIN AND FREQUENCY

Sukehiro Ito and Yoshito Ueno, Tokyo, Japan, assignors to Nippon Electric Company, Tokyo, Japan, a corporation of Japan Filed Mar. 10, 1964, Ser. No. 350,737
Claims priority, application Japan, Mar. 18, 1963, 38/14,641
18 Claims. (Cl. 325—346)

ABSTRACT OF THE DISCLOSURE

An improved negative feedback RF receiver for an alternating current carrier signal either phase or frequency modulated by other alternating current signals and including an antenna, a converter for translating the received modulated carrier signal into an IF signal, an IF amplifier for the IF signal, a source of a local alternating current signal, a demodulator for translating the IF and local signals into an output signal, an amplifier for the output signal, a first feedback circuit for feeding back a portion of the amplified output signal in negative feedback relation to control the frequency of the local signal, and an improved second feedback circuit arrangement comprising coherent and peak-value detectors utilizing the amplified IF signal, the local signal and a noise signal for generating a control signal feedback in negative feedback relation to adjust the gain of the IF amplifier. Modifications include second and third feedback circuits including coherent and peak-value detectors utilizing the amplified IF signal, the local signal and a noise signal for generating two control signals of which a first control signal fed back in negative feedback relation controls the gain of the IF amplifier and a second control signal fed back in negative feedback relation controls either the gain of the output signal amplifier or the frequency of the local signal.

Figures 1, 4:
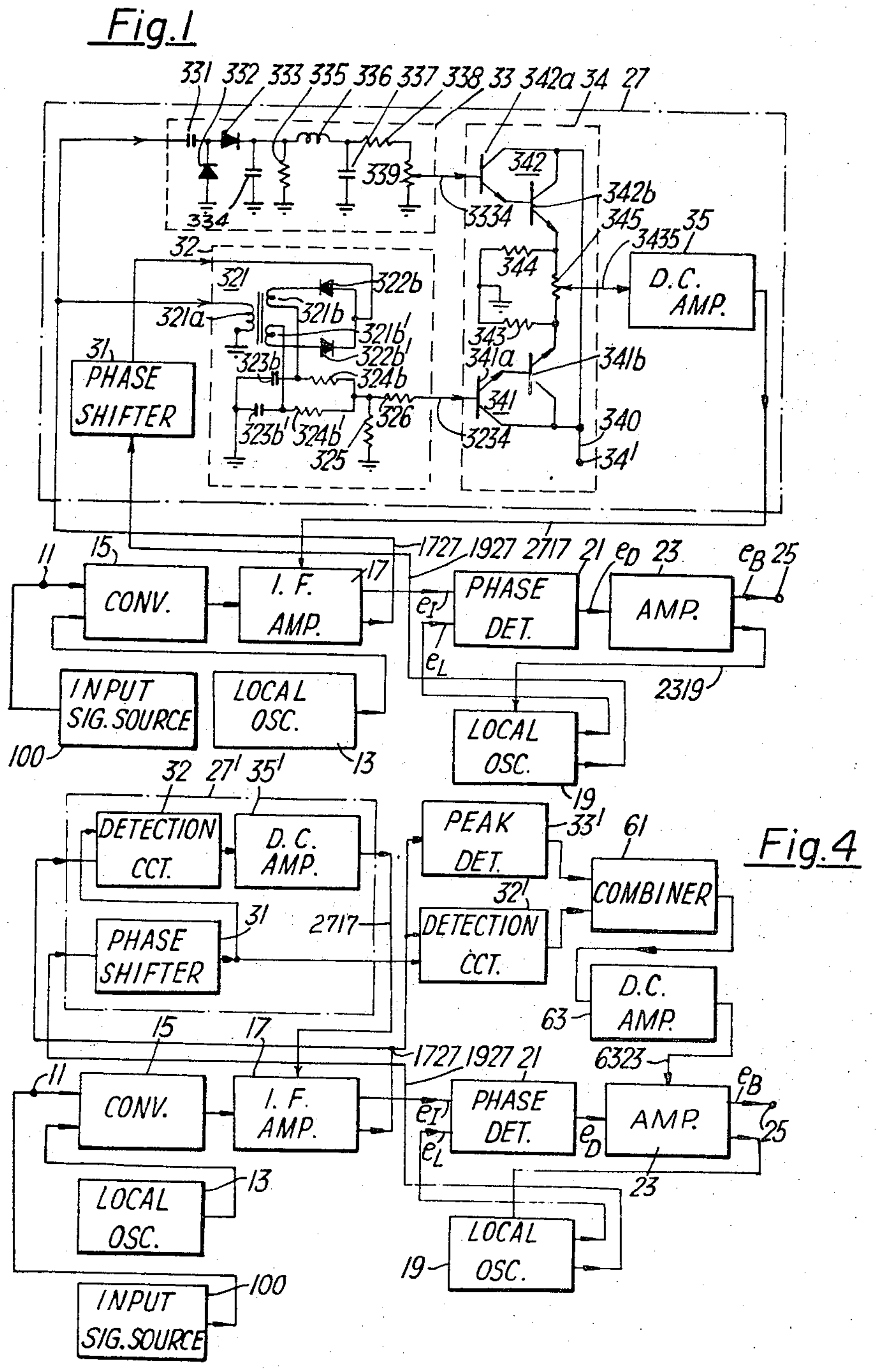

This invention relates to receiving equipment for angle modulated waves such as frequency modulated or phase modulated waves and more particularly to a receiver which utilizes negative feedback.

In high sensitivity receivers for frequency modulated waves or phase modulated waves, negative feedback frequency modulation receivers and negative feedback phase detection receivers have been widely used. In prior art negative feedback phase detection receivers, the negative feedback through the negative feedback circuit is selected such that the threshold level is optimized to a desired value. However, if the input power level is far higher than the threshold level, the channel signal to noise ratio is poor, due to noise (such as crosstalk noises in receiving multi-channel telephone signals). It has usually been considered, therefore, that negative feedback phase detection type receivers are not suitable for receiving signals of high input power level or where high quality multichannel transmission is required. Although the need for improved receivers particularly in over-the-horizon microwave communication equipment has received considerable publicity, the need for the less publicized line-of-sight communication equipments for high quality multichannel telephone signals has also been increasing.

Therefore, an object of this invention is to provide an improved receiver which utilizes negative feedback.

A further object of this invention is to provide negative feedback phase detection receiving equipment which not only facilitates an improved threshold level when the input power level is low, but also facilitates low noise signal reception (such as in multichannel telephone signal) when the input power level is relatively high or in other words, to receive signals with a high signal to noise ratio.

As mentioned hereinabove, the difficulty encountered in the conventional receivers of this kind is that a satisfactory signal to noise ratio could not be obtained for input signals of relatively high level particularly where an adjustment previously has been made to obtain the most desirable (optimum) threshold level. In order to overcome this difficulty, the present invention provides means varying the quantity of the negative feedback of the negative feedback phase detection receiver in response to the input power level. With this invention the threshold level can be optimized even when the input power level is very low, and high quality multichannel telephone signals can also be received when the input power level is higher. In other words, by means of this invention the quantity of negative feedback is automatically changed in accordance with the variation of the input power level. Thus, the negative feedback phase detection receiver of this invention enables the reception of high quality multichannel telephone signals (high signal to noise ratio) without adversely affecting the improved effect on the threshold level.

Figures 2, 3:
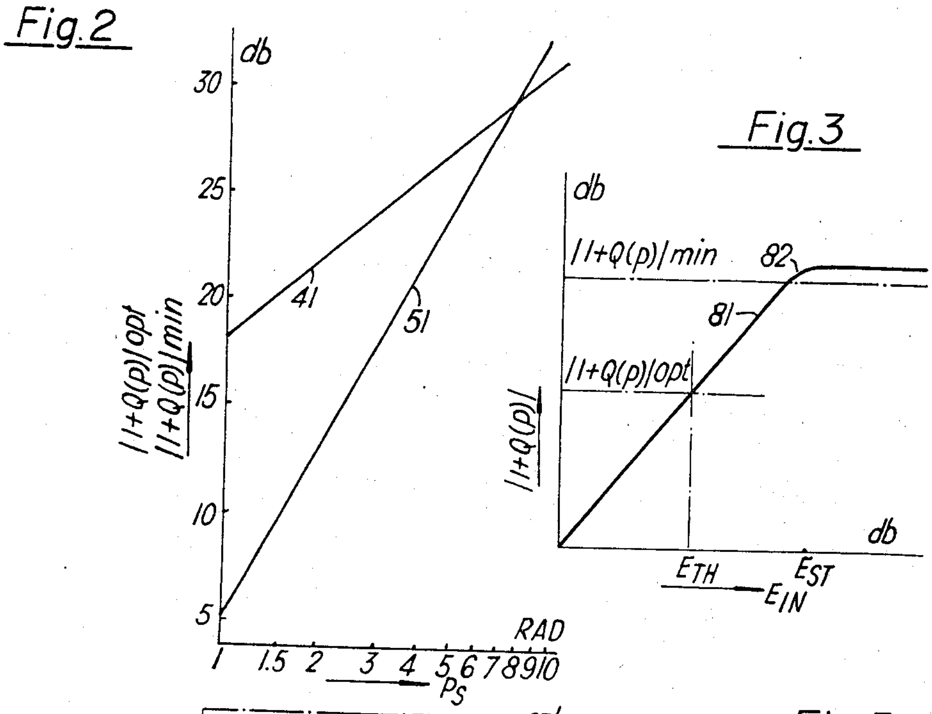
Figure 5:
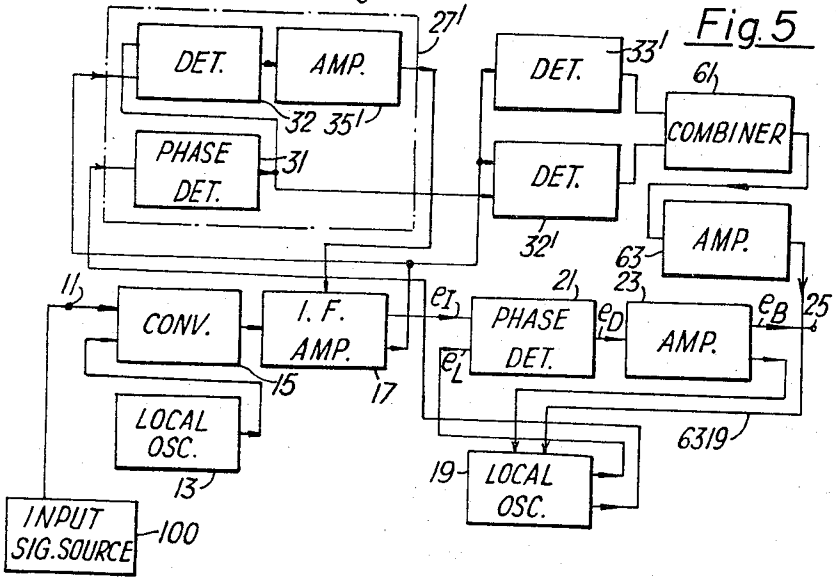

The above-mentioned and other features and objects of this invention and the means of attaining them will become more apparent and the invention itself will be best understood by reference to the following description of embodiments of the invention taken in conjunction with the accompanying drawings in which:

FIG. 1 is the block diagram showing an embodiment of this invention containing partially detailed circuit diagrams, FIG. 2 and FIG. 3 are graph explaining the operation of the embodiment of FIG. 1 and FIGS. 4 and 5 are block diagrams showing the other embodiments of the invention.

Referring to FIG. 1, there is illustrated therein one embodiment of a negative feedback phase detection receiver according to this invention. In this embodiment the input terminal 11 is supplied with received frequency modulated high frequency waves from source 100 (such as an antenna). A frequency converter 15 is connected to terminal 11 and is associated with a local oscillator 13 for converting the received frequency modulated waves into intermediate frequency signals. An intermediate frequency amplifier 17 is connected to converter 15 for amplifying the intermediate frequency signal to provide an amplified intermediate frequency signal which can be demodulated. A phase detector 21 (which is associated with a demodulation local oscillator 19 which produces oscillation power whose voltage is larger than that of the signal power of any of the amplified intermediate frequency signals as described in U.S. Patent No. 3,069,625, M. Morita-S. Ito) is connected to an output of IF amplifier 17 for demodulating the intermediate frequency signal into a baseband signal (i.e., into a video signal containing frequency-division multichannel telephone signals). Detector 21 includes an envelope detector for the amplitude modulated voltage resulting from the vector sum of a demodulation local oscillator voltage and the amplified intermediate frequency signal. A baseband amplifier 23 is connected to said phase detector 21 and amplifies the baseband signal to a level which is sufficiently large to permit demodulation (as described in the aforementioned U.S. patent specification). Furthermore baseband amplifier 23 simultaneously supplies the baseband signal with the required amplitude and phase for negative feedback which will be described hereinafter. An output terminal 25 is provided for baseband amplifier 23 which supplies the demodulation output signals. A frequency modulation negative feedback path 2319 is provided and connected to baseband amplifier 23 which frequency modulates the demodulation local oscillator power so that the frequency and phase of the power respectively follow the frequency and phase of the frequency modulated wave supplied to the phase detector 21. Feedback path 2319 negatively feeds back a part of output of the baseband amplifier 23 to the demodulation local oscillator 19, which in turn produces a feedback signal connected via lead 1927 to control circuit 27. An output from the intermediate frequency amplifier 17 is supplied through the lead 1727 to the control circuit 27. An output of control circuit 27 is connected to the intermediate frequency amplifier 17 through the lead 2717 to automatically control the gain of the intermediate frequency amplifier 17 which will be further described hereinafter.

In the negative feedback phase detection receiver of FIG. 1, the phase detector 21 will be supplied with amplified thermal noises as well as the amplified frequency modulated wave signal power through the intermediate frequency amplifier 17. The spectral density of the thermal noise power which accompanies the received electromagnetic waves (or which accompanies received frequency modulated waves supplied to the input terminal 11) is $kTF$, where $k$ is Boltzmann's constant, T is the absolute temperature corresponding to a power level of said thermal noises, and F is the noise figure of this negative feedback phase detection receiver (as described in "Information Transmission, Modulation and Noise" by M. Schwarz, section 5, compiled in "Electrical and Electronic Engineering Series" of McGraw-Hill Book Co., Inc.). Therefore, assuming that the thermal noise is the composition of small sine waves, and if the total gain from input terminal 11 to the input side of phase detector 21 is represented as A, then the noise voltage $dN$, whose angular frequency falls between $p$ and $p+dp$ among all the thermal noise powers reaching the input side of phase detector 21, is given by:

$$dN=\sqrt{2}A.\sqrt{kTF}.\cos\,[pt+P_N(p)]dp/(2\pi)$$

where $P_N(p)$ is the phase constant of thermal noises whose angular frequency at input terminal 11 is $p$. Therefore, assuming: that $p_I$ is the center angular frequency of the intermediate frequency signals in the intermediate frequency amplifier 17; that the angular frequency bandwidth from the antenna to the input side of the phase detector 21 extends from $p_I-\pi B_0$ to $p_I+\pi B_0$; that the thermal noise arriving at the phase detector 21 is a white noise; and that the spectral density $kTF$ of the thermal noise and the overall gain A do not depend on wave length or angular frequency $p$, then the definite integral value N given by integrating the $dN$ from $p_I-\pi B_0$ to $p_I+\pi B_0$ regarding angular frequency $p$, is as follows:

$$N=\sqrt{2}A.\sqrt{kTF}.N_0\,(p_I,\,B_0,\,P_N,\,t)$$

where $N_0\,(p_I,\,B_0,\,P_N,\,t)$ denotes the integral value given by integrating $\cos\,(pt+P_N)/(2\pi)$ from $p_I-\pi B_0$ to $p_I+\pi B_0$ regarding angular frequency $p$. On the other hand, if we assume $E_s$ is the R.M.S. signal power of received frequency modulated waves at the input terminal 11 and $P_S$ is the phase shift occurring in the received frequency modulated waves due to the frequency modulation of multichannel telephone signals, then the signal voltage S of the amplified intermediate frequency signals applied to the phase detector 21 is:

$$S=\sqrt{2}A.\sqrt{E_s}.\cos\,(p_It+P_S)$$

Therefore, if we let N denote $$N\,(E_S,p_I,\,B_0,\,P_N,\,t)=\sqrt{kTF/E_s}.\,N_0\,(p_I,\,B_0,\,P_N,\,t)$$

the noise voltage N of the amplified white noise is $$N=\sqrt{2}A.\sqrt{E_S}.N\,(E_s,\,p_I,\,B_0,\,P_N,\,t)$$

and the amplified intermediate frequency signal voltage $e_I$ which is applied to the phase detector 21 and which is the sum of the voltages S and N is expressed as $$e_I=\sqrt{2}A.\sqrt{E_S}.[\cos\,(p_It+P_s)+N\,(E_s,\,p_I,\,B_0,\,P_N,\,t)] \quad (1)$$

If the demodulation local oscillator voltage supplied to the phase detector 21 from the demodulation local oscillator 19 is represented as $e_L$, and if the R.M.S. value of this power $e_L$ is represented as $E_L$; and if the difference value of $\pi/2$ minus a mean phase difference between the phase of the amplified intermediate frequency signal and the phase of the demodulation local oscillator power is denoted by $P_{IL}$; and if the phase shift produced by frequency modulation of the multichannel telephone signal due to the negative feedback from base-band amplifier 23 to the modulation local oscillator 19 in the demodulation local oscillator power is denoted by $P_{LS}$; and if similar phase shift produced by the thermal noise is represented by $P_{LN}$, then:

$$e_L=\sqrt{2}.\sqrt{E_L}.\sin\,(p_It+P_{IL}+P_{LS}+P_{LN}) \quad (2)$$

In this invention, as described in the above-mentioned specification, the amplified intermediate frequency signal voltage $e_I$ and the demodulaton local oscillator voltage $e_L$ are supplied to the phase detector 21 such that these voltages are in rectangular phase relation. The amplitude of the amplitude modulation wave produced from the sum of these waves is envelope detected by utilizing the fact that the amplitude of the composed voltage (which is the vector sum of these voltages) varies with the relative phase of both supplied voltages. Therefore, the detected output $e_D$ at the output of phase detector 21 is represented (if the R.M.S. value $E_L$ of the demodulation local oscillator power is far larger than the R.M.S. value $A^2E_s$ of the signal power of the amplified intermediate frequency signal as described in the above-mentioned U.S. Patent 3,069,625), by:

$$e_D=\sqrt{2}A.D.\sqrt{E_S}[\sin\,P_s'+N'\,(E_s,\,B_0,\,P_N',\,t)] \quad (3)$$

where D is the detection sensitivity of the phase detector 21, and $P_s'$ is given by:

$$P_s'=P_s-(P_{IL}+P_{Ls}+P_{LN}) \quad (4)$$

and $N'\,(E_s,\,B_0,\,P_N',\,t)$ is an integral of $N\,(E_s,\,p_I,\,B_0,\,P_N,\,t)$ from the lower limit $-\pi B_0$ to the upper limit $\pi B_0$, and in which integral the argument $p$ of the function to be integrated is replaced by $p-p_I$ and in which $P_N$ is replaced by:

$$P_N'=P_N-(P_{IL}+P_{Ls}+P_{LN}) \quad (5)$$

In the negative feedback phase detection receiver shown in FIG. 1, the detector output $e_D$ of phase detector 21 is amplified by the baseband amplifier 23 which has a gain $B(p)$ and produces the amplified baseband signal $e_B$ which is obtained at the output terminal 25. The output of the demodulation local oscillator 19 which has been frequency modulated by a part of this baseband signal $e_B$ is the demodulation local oscillator voltage $e_L$. Therefore, assuming that the output from the demodulation local oscillator 19 is the product of the integral circuit and the phase modulation circuit and if we denote the transfer function of the integral circuit by $T(p)$, and if we denote the modulation sensitivity of the phase modulation circuit by M, if the difference between the oscillation frequency of the demodulation local oscillator in the case where the negative feedback circuit is open and the received intermediate frequency is $p'$, then the total phase shift found in the demodulation local oscillator power $e_L$ due to the negative feedback from baseband amplifier 23 to the demodulation local oscillator is $$P_{LS}+P_{LN}+p'T(p)=T(p)\cdot M\cdot e_B=M\cdot B(p)\cdot T(p)\cdot e_D \quad (6)$$

Substituting Equation 3 into Equation 6, the following equation may be obtained.

$$(P_{LS}+P_{LN})/Q(p)+p'T(p)=\sin P_s'+N'(E_s, B_0, P_N', t) \quad (7)$$

where $$O(p)=\sqrt{2}A\cdot D\cdot B(p)\cdot M\cdot T(p)\cdot\sqrt{E_S} \quad (8)$$

However, as already mentioned, $$P_s'=P_s-(P_{IL}+P_{LS}+P_{LN})$$
$$P_N'=P_N-(P_{IL}+P_{LS}+P_{LN})$$

$$N'(E_S, B_0, P_{N'}, t)=\sqrt{kTF}/E_S\int_{-\pi B_0}^{\pi B_0}\cos[(p-p_1)t+P_{N'}]dp/(2\pi) \quad (9)$$

Next, consider the signal to noise ratio in the baseband signal $e_B$ with reference to a particular channel contained in the multichannel telephone signal band for the case where the signal power of the received frequency modulated wave approaches the threshold level. Defining the center angular frequency of this specific channel as $p_1$; the angular frequency bandwidth of this channel as between $p_1-\pi B_1$ and $p_1+\pi B_1$; the phase shift produced by frequency modulation of the signal power of this specific channel in the received frequency modulated wave as $p_{s1}$; and the phase shifts of the phase detection negative feedback in the demodulation local oscillator power by the signal of this specific channel and the white noise contained in this specific channel as $P_{LS1}$ and $P_{LN1}$ respectively; then from Equation 7 the following equations result assuming that $P_{S1}$, $P_{LS1}$, $P_{LN1}$, and $$P_{S1}-(P_{LS1}+P_{LN1})$$

are very small as compared with $P_s$, $P_{LS}$, $P_{LN}$ and 1, respectively, $$P_{LS1}=(Q(p_1)\cos P_s)P_{s1}/[1+Q(p_1)\cos P_s']$$
$$P_{LN1}=Q(p_1)\sqrt{2}N_1(E_s, p_1, B_1, P_N', t)\div[1+Q(p_1).\cos P_s'] \quad (10)$$

where $N_1$ ($E_s$, $p_1$, $B_1$, $P_N'$, $t$) is the sum of two integrals, in one of which the lower and upper limits are replaced with $-p_1-\pi B_1$ and $-p_1$, respectively, and in another of which the lower and upper limits are replaced with $p_1$ and $p_1+\pi B_1$, respectively, each in Equation 9.

When the signal power of the received frequency modulated wave at input terminal 11 is small, the noise at the negative feedback circuit increases and $P_s'$ of Equation 4 aproaches $\pi/2$ and cos $P_s'$ becomes smaller. Therefore, in Equation 4, the phase shift in the demodulation local oscillator power caused by frequency modulation of the signal of this specific channel (that is, the amount $P_{LS1}$ which is equivalent to the amount of the said signal) becomes smaller. Consequently, the phase shift in this local oscillator power caused by the frequency modulation of the white noise associated with the channel in question (that is, the $P_{LN1}$ equivalent to the amount of the noise contained in this channel) becomes larger. Accordingly, as the signal in this channel (the signal to noise ratio in the detection output $e_B$) rapidly decreases so that the threshold phenomena appears, the negative feedback phase detection receiver loses its ability to demodulate.

We can calculate the signal to noise ratio as follows. If the multichannel telephone signal is regarded as an evenly distributed random noise, as it often does, and if we replace sin $P_S'$ by $P_S'$ (on the premise that the signal power of the received frequency modulated wave at input terminal 11 is larger than the threshold level), we can derive the following equations from Equations 5 and 7:

$$P_s'+P_{IL}=P_s'/[1+Q(p)]-Q(p).N'(E_s, B_0, P_N', t)/[1+Q(p)] \quad (11)$$

Then putting $$\overline{P_s'^2}=\overline{(P_s'+P_{IL})^2} \quad (12)$$

$$P_s'^2=P_{SR}^2+kTF.B_N/E_S \quad (13)$$

Then $$\overline{P_{SR}^2}=\overline{(P_S/[1+Q(p)])^2}$$
$$B_N=\int_0^{\pi B_0}|Q(p)/[1+Q(p)]|^2dp/(2\pi) \quad (14)$$

and $\overline{P_{SR}^2}$ in Equation 14 denotes the mean square of the phase shift of a multichannel telephone signal which is compressed by negative feedback and whose distribution of instantaneous values represents the same characteristics as those of the random noise, and $B_N$ is the equivalent noise band width in the case where the noise band is replaced by the rectangular band. In general, since the probability density function $p(x)$ of the instantaneous value $x$ of the random noise (whose R.M.S. value is X), is given by $$p(x)=\exp(-[x/X]^2/2)/(\sqrt{2\pi}X)$$

the probability density function $p(P_s')$ of the instantaneous values of phase shift $P_s'$ given by Equation 4 is given by $$p(P_s')=\exp(-[(P_s'+P_{IL})/\overline{P_s'}]^2/2)/(\sqrt{2\pi}\overline{P_s'}) \quad (15)$$

The signal power and noise power of the specific channel of the baseband signal $e_b$ are obtained from the Equation 10, whose powers vary with time in accordance with the variation of phase shift $P_s'$ given by Equation 4. Each of the mean values of these powers is proportional to each value that is respectively given by multiplying each of phase shifts $P_{LS1}$ and $P_{LN1}$ of said powers (which correspond to the specific values of said phase shift $P_s'$) by the probability density function $p$ ($P_s'$) of said specific value of $P_s'$, and then integrating each of the product value over all the range of values in which $P_s'$ exists. Therefore, representing the ratio of phase shift $P_{LS1}$ and $P_{LN1}$ in the demodulation local oscillator power to the power of the specific channel among the baseband signal $e_B$ by C, the square of the signal power $S_1$ of said channel of the baseband signal $e_B$ and the square of noise power $N_1$ included in said channel are respectively equal to the integral regarding $P_s'$ of $C^2.p(P_s').|p_{LS1}|^2$ and $c^2.p(P_s').|P_{LN1}|^2$ between the limits $-\infty$ and $+\infty$ of $P_s'$. The signal to noise ratio $S^1N_1$ of the channel in the baseband signal $e_B$ is written as follows (by representing the peak modulation index of frequency modulated wave by $P_0$) and where the volume of said channel is zero relative level and putting Equations 10 and 15 into the said integrals, $$S_1/N_1=\sqrt{E_s/(2kTFB_1)}.P_0x\left[\frac{\int_{-\infty}^{+\infty}p(P_s')\left|\frac{Q(p_1)\cos P_s'}{1+Q(p_1)\cos P_s'}\right|^2dP_s'}{\int_{-\infty}^{+\infty}p(P_s')\left|\frac{Q(p_1)}{1+Q(p_1)\cos P_s'}\right|^2dP_s'}\right]^{1/2} \quad (16)$$

In the next place, let us obtain $P_{TH}$ which gives the threshold level among the values of $P_s'$ defined by Equation 4. The signal to noise ratio $S_1N_1$ shown by Equation 16, $(S_1N_1)_0$ that is where the value of R.M.S. value $E_s$ of the input power is large enough (because in this case the factor enclosed by angular brackets of the right-hand side of the Equation 16 is equal to 1), is given by $$(S_1N_1)_0=\sqrt{E_s/(2kTFB_1)P_0}$$

and is proportioned to $\sqrt{E_s}$. But as the R.M.S. value $E_s$ of input power diminishes, the factor enclosed by angular brackets of the right-hand side of Equation 16 cannot be neglected, and the signal to noise ratio $S_1/N_1$ rapidly decreases. In this case, defining the threshold level as the point at which the signal to noise ratio $S_1/N_1$ decreases (that is, where $S_1/N_1$ decreases to one-half of the extended part of $(S_1/N_1)_0$ and representing $P_s'$ at the threshold level by $P_{TH}'$ then by substituting these values into Equations 15 and 16, the following relations will hold for the threshold level:

$$2\int_{-\infty}^{+\infty}p(P_s')\left|\frac{Q(p_1)\cos P_s'}{1+Q(p_1)\cos P_s'}\right|^2 dP_s'=\int_{-\infty}^{+\infty}p(P_s')\left|\frac{Q(P_1)}{1+Q(p_1)\cos P_s'}\right|^2 dP_s' \quad (17)$$

and $$p(P_{TH})=\exp\left(-(P_{TH}+P_{IL})/\bar{P}_{TH}^2/(\sqrt{2\pi P_{TH}}\right)$$

From Equation 13 and the value $P_{TH}$ to satisfy the above Equation 17 we have $$\bar{P}_{TH}^2=\bar{P}_{SR}^2+kTF.B_N/E_{TH} \quad (18)$$

where $E_{TH}$ represents the R.M.S. the signal power of that input power corresponding to the threshold level.

Next, we will examine the characteristics of the negative feedback loop which will be needed to improve the threshold level. Denoting the signal bandwidth of the multichannel telephone signal as $B_s$, and the power ratio of the noise contained in the same band as the said multichannel telephone signal band $B_s$, to the received input signal on the threshold level, by $(N/C)_{B_sTH}$, then the power ratio is, as well known, $$(N/C_{B_sTH}=kTFB_s/E_{TH} \quad (19)$$

Then, putting the result of Equation 18 into the Equation 19, we obtain $$(N/C_{B_sTH}=(\bar{P}_{TH}^2-\bar{P}_{SR}^2)/G \quad (20)$$

In Equation 20 G is the quotient of the equivalent noise bandwidth $B_N$ divided by the multichannel telephone signal bandwidth $B_s$. Therefore, in order to obtain the best improvement of the threshold level in the negative feedback phase detection system, it is desirable to search the value of each factor to make the right-hand side of the Equation 20 a minimum. On the other hand, each factor of the right-hand side of this Equation 20 is a characteristic function of the negative feedback circuit. If the characteristic functions of the given negative feedback circuit is given, then that negative feedback quantity $\{1+Q(p_1)\}_{OPT}$ necessary to obtain the minimum threshold level is determined by Equations 17, 18 and 20, because the right-hand side is a function of negative feedback quantity $\{1+Q(p_1)\}$ as understood from Equation 14.

Next, let us consider the noise in the higher part than the threshold level. In general, the optimum value of the negative feedback quantity $\{1+Q(p)\}_{OPT}$ needed to obtain the minimum threshold level varies with the characteristics function of the negative feedback circuit, as noted by the abovementioned Equation 8. On the other hand, in case the received input power level is high the negative feedback quality $\{1+Q(p)\}_{OPT}$ is insufficient to provide a satisfactory high quality multichannel telephone signal. As already seen, when using a negative feedback phase detection receiver for receiving multichannel telephone signal with high quality, it is necessary to suppress the unintelligible crosstalk noise mainly produced by the detecting action of phase detector 21, to a lower value. Noises other than the above-mentioned unintelligible crosstalk noise exist such as those caused by the modulation characteristics of the demodulation local oscillator 19 and by the amplifier distortion of baseband amplifier 23. However, inasmuch as these noises are small as compared to the unintelligible crosstalk noise caused by the phase detector, only this unintelligible crosstalk noise will be discussed below.

When the effective value $E_s$ of the received frequency modulated wave power is satisfactorily large. $P_{LN}$ and $N'(E_s, B_0, P_N', t)$ in Equation 7 are negligible then Equation 7 becomes $$P_{LS}=Q(p)\sin(P_s-P_{IL}-P_{LS}) \quad (21)$$

Therefore, in connection with the distortion in phase detector 21 distortion factors $W_2$ and $W_3$ caused by the higher harmonic wave distortion due to second and third harmonic waves are derived (by calculating higher harmonic waves contained in the phase shift $P_{LS}$ developed in the local oscillator power at the time when a signal which is frequency modulated by pure sine wave is supplied to phase detector 21) as follows:

$$W_2=\left|\frac{Q(2p).\tan P_{IL}J_2(R)}{Q(p).J_1(R).\{1+Q(2p).\cos P_{IL}J_0(R)\}}\right|$$

$$W_3=\left|\frac{Q(3p).J_3(R)}{Q(p).J_1(R).\{1+Q(3p)\cos P_{IL}J_0(R)\}}\right| \quad (22)$$

where $p$ is the angular frequency of the fundamental frequency and R is the product of the modulation index of input signal multiplied by $|1/\{1+Q(p)\}|$ respectively. Therefore, in such a circuit where the so-called loaded noise (which corresponds to the distortion factor due to second and third order harmonics of sinusoidal wave having equal R.M.S. value to the multichannel telephone signals of equal characteristics to the random noise), the signal to noise ratio corresponding to the unintelligible crosstalk noise are respectively represented (by representing the crosstalk noise due to second and third harmonics distortion by $H_2$ and $H_3$, respectively), as follows:

$$S/H_2=\sqrt{3.In}/(4_{W2}\sqrt{P_{eq}}) \quad (23)$$

$$S/H_3=\sqrt{3.In}/(6\sqrt{2}W_3\sqrt{P_{eq}}) \quad (24)$$

where, $n$ and $P_{eq}$ represent number of channel and equivalent loaded noise power of frequency division multichannel telephone signals, respectively.

As a practical example of high quality long distance line good enough to transmit a high quality multichannel telephone signal, reference is made to the standard established by C.C.I.R. (International Radio Consultative Committee) which states that the permissible noise for the section of distance up to 2,500 km. between transmitting and receiving stations should be below 7,500 pw. As a matter of fact, when we consider a section of 100 km. in average (in which we assume one ninth of overall noise is caused by the distortion of phase in the detector and the said distortion is originated from the second and third higher harmonics distortion to the same extent), the signal to noise ratio in consideration of these harmonic distortions is 75.3 db.

From the abovementioned Equations 22, 23 and 24, it is understood that although the $S/N$ ratio for the unintelligible crosstalk noise $H_3$ caused by the third harmonic distortion is almost independent on $P_{IL}$, the $S/N$ ratio for the unintelligible crosstalk noise $H_2$ caused by the second harmonic distortion is almost proportional to sin $P_{IL}$. Therefore, calculating the allowable value for the said $P_{IL}$ to satisfy the said assumption (that noise due to the second higher harmonic distortion and the noise due to the third higher harmonic distortion are equal to each other) the result is:

$$P_{IL} \leqq P_{SR}/2 \quad (25)$$

This result assumes R is smaller than 1. Namely, it is understood that the value $P_{IL}$, versus the unintelligible crosstalk noise, can be up to one half of the value $P_{SR}$ which is obtained by compressing the R.M.S. phase shift of the received signal with negative feedback. If we next consider the condition where R is smaller that 1, from Equations 22 and 24, Equation 26 below is obtained:

$$S/H_3 = \sqrt{6.2}\sqrt{n}\{1+Q(p_1)\}^3/(P_{eq}P_s^2) \quad (26)$$

From Equation 26 it is seen that the negative feedback quantity is determined at that value which satisfies the said noise distribution when $P_s$ and $n$ are given. The actual choice of this negative feedback quantity will now be examined.

In the calculation from Equation 26, of the relation between the absolute value $|1+Q(p)|_{MIN}$ of the minimum negative feedback quantity to suppress the noise below the permissible value of unintelligible crosstalk (noise to satisfy the standard of C.C.I.R.) and the R.M.S. phase shift $P_s$ (in the case where there are 120 channels), a straight line shown as 41 in FIG. 2 is obtained. In FIG. 2 the abscissa $P_s$ is plotted on a semi-log radian scale and the axis is plotted for $|1+Q(p)|_{MIN}$ in decibels. On the other hand, when we calculate from Equations 17 and 18, the relation between the absolute value $|1+Q(p)|_{OPT}$ of the optimum negative feedback quantity (which gives the minimum threshold level) and the R.M.S. phase shift $P_s$ in the case of 120 channels, the straight line 51 in FIGURE 2 is obtained. Comparing the lines 41 with 51, it is understood that the difference between the two negative feedback quantities $|1+Q(p)|_{OPT}$ and $|1+Q(p)|_{MIN}$ is about 13 db, in the case where the number of channels is 120 and the R.M.S. phase shift $P_s$ is 1 radian. That is, a difference of 13 db is required between the negative feedback quantity $|1+Q(p)|_{OPT}$ (which gives the minimum threshold level in case the level of the received input signal is such a low value that it approaches the threshold level) and the negative feedback quantity $|1+Q(p)|_{MIN}$ to suppress the unintelligible crosstalk noise to the value satisfying the standard of C.C.I.R. for the case the level of the received input signal is high enough.

Therefore, in order to obtain a minimum threshold level for the received low level frequency modulated wave and to suppress the unintelligible crosstalk noise (to a value which meets the C.C.I.R. standard for the received frequency modulated wave of relatively high level), it is necessary, as shown in FIG. 3 (in which the abscissa is plotted for received input power $E_{IN}$ on a decibel scale and the ordinate is plotted for the negative feedback quantity $|1+Q(p)|$ on a decibel scale) that the negative feedback quantity of the negative feedback circuit be automatically changed along at first the line 81 and then along the shoulder portion of the curve 82. FIGURE 3 shows the most desirable value $|1+Q(p)|_{OPT}$ (for the case where the received input power is as small as the threshold level $E_{TH}$), and the minimum value $|1+Q(p)|_{MIN}$ (for the case where the received input power is the large value $E_{ST}$). Moreover, it illustrates that at least said minimum value $|1+Q(p)|_{MIN}$ value is maintained in the case where the received input power is larger than the sufficiently large value $E_{ST}$. In order to cause the negative feedback quantity to change as mentioned, above, any one or more factors contained in the right-hand side of the Equation 8 may be varied. In addition, the overall characteristics consisting of straight line portions 81 and the curve portion 82 (if the channel quality is not required to satisfy the C.C.I.R. standard), many have other shapes.

The control circuit 27 as shown in FIGURE 1, is the circuit which changes the overall gain A which is one of the factors in Equation 8. This control circuit 27 comprises a first detection circuit 32 which is not only supplied with the output of phase shifter 31 (which gives a 90° phase shift to the demodulation local oscillator signal supplied through the lead 1927 from demodulation local oscillator 19 and produces local oscillator signal phase shifted almost similarly as in the intermediate frequency signal) but is also supplied with the output of intermediate amplifier 17 through lead 1727 (for coherent-detecting of only the amplitude of carrier components of frequency modulated waves in the intermediate signal $e_I$ and the same frequency component as in this carrier). A second detection circuit 33 is provided and supplied with the output of intermediate frequency amplifier 17 likewise through lead 1727 for detecting the peak value of the intermediate frequency signal $e_I$ accompanied by noise. A balanced type DC amplifying circuit 34 is provided which produces an amplified output representing the sum of the outputs of the first and second detection circuits 32 and 33. A DC amplifying circuit 35 is provided which amplifies the output of the amplifier circuit 34 with high stability. The first detector circuit 32 comprises an intermediate frequency transformer 321 which has a primary winding 321a connected to lead 1727 (which is supplied with a portion of the amplified intermediate frequency signal $e_I$) and two secondary windings 321b and 321b'. Rectifiers 322b and 322b' are connected between the phase shifter 31 and one terminal of each of the secondary windings 321b and 321b' in an opposite direction to each other. Bypass capacitors 323b and 323b' are connected with the other terminal of each of the secondary winding 321b and 321b' so that they may be supplied with an intermediate frequency signal (with the same amplitude but reverse phase to each other), from the said secondary windings 321b and 321b' as well as with the phase shifted local oscillation signal (which are in almost the same phase as said intermediate frequency signals from the phase shifter 31). These capacitors detect the amplitude of vector sum of each one of the intermediate frequency signals and the phase-shifted local oscillation signal. The resistors 324b and 324b' are also connected to the other end of each of the said secondary windings 321b and 321b' to provide a signal representing the sum of the detection outputs obtained at the said ends. A resistor 325 is connected between the end terminals of the resistors 324b and 324b' furthest away from the intermediate frequency transformer 321 and earth. A resistor 326 is connected to resistor 325 and also through lead 3234 to the balanced type DC amplifying circuit 34. The coherent detected voltage is obtained across the resistor 325. The second detector 33 comprises a coupling capacitor 331 having one terminal connected with lead 1727 to receive a portion of amplified intermediate frequency signal $e_I$. A peak value detector consisting of diodes 332, 333, capacitor 334, and resistor 335 are connected to each other so as to detect the peak-value of the intermediate frequency signal which is passed through the coupling capacitor 331. Choke coil 336 and bypass capacitor 337 compose a low pass filter connected to the peak-value-detector for taking off the residual higher frequency component from the output of the detector. A fixed resistor 338 and variable resistor 339 are connected to the low pass filter and provide a voltage divider. The slidable terminal of the voltage divider is connected to the balanced type DC amplifier circuit 34 through lead 3334. As seen from this arrangement part of the amplified intermediate frequency signal $e_I$ is supplied to the said detector 33 through the lead 1727 and is subjected to peak-value detection, and the detected output signal voltage representing the peak value of the intermediate frequency signal (which is accompanied by a noise component) appears on the lead 3334. The balanced type DC amplifier circuit 34 is supplied with the detected output of detection circuits 32 and 33 through leads 3234 and 3334, respectively. Amplifier 34 has a first emitter follower amplifier 341 which has a high input impedance and is composed of transistor 341*a* (whose collector is connected to the power supply terminal 34′ through lead 340 and whose base is connected to lead 3234) and transistor 341*b* (whose collector is similarly connected to power supply terminal 34′ and whose base is connected to the emitter of transistor 341*a*). Amplifier 34 also includes a second emitter follower amplifier 342 which has a high input impedance connected to lead 3334 and is composed of transistors 342*a* and 342*b* (corresponding to the said transistors 341*a* and 341*b*) respectively. Resistors 343 and 344 are connected respectively to the emitters of transistors 341*b* and 342*b* of the said first and second emitter follower amplifiers 341 and 342 to give the DC operating point to the transistors of said amplifiers 341 and 342. A variable resistor 345 is provided whose slidable terminal is connected to the DC amplifying circuit 35 through lead 3435. The fixed terminals of variable resistor 345 is connected at both ends respectively to the emitters of transistors 341*b* and 342*b*. As seen from this arrangement, the output of the balanced type DC amplifying circuit 34 supplied a voltage on lead 3435 which is a DC-amplified voltage representative of the sum of the voltages produced by picking up detected outputs of the detection circuits 32 and 33 and in accordance with the position of the slidable terminal of the variable resistor 345. The output of the balanced type DC amplifying circuit 34 is (after it has been amplified again in the stabilized DC amplifying circuit 35) supplied through lead 2717 to control the gain of the control portion of the intermediate frequency amplifier 17.

When the level of a received frequency modulated wave is sufficiently high (since the detected output signal of the first detection circuit 32 as well as the detected output signal of the second detection circuit 33 represent only the amplitude of the frequency modulated wave of the intermediate frequency signal $e_I$), the DC output of the sum of these detected outputs remains constant (wherever we may change the position of slidable terminal of variable resistor 345 in the balanced type DC amplifying circuit 34). We adjust the variable resistor 339 of the second detection circuit 33 so that the detected output of detection circuits 32 and 33 become equal to each other. On the other hand, if the level of the received frequency modulated wave decreases and approaches the threshold level, the output of the second detection circuit 33 will become larger than the output of the first detection circuit 32. As mentioned above, it is necessary to control the gain of the intermediate frequency amplifier 17 so that the absolute value $|1+Q(p)|$ of the negative feedback quantity given in connection with Q(*p*) of Equation 8 will be at least $|1+Q(p)|_{MIN}$ (for the case where the level of a received frequency modulated wave is sufficiently high, and on the other hand, in case the receiving input power level becomes as low as threshold level), therefore, it will be necessary to adjust the slidable terminal portion of variable resistor 345 in the amplifying circuit 34 by a preliminary adjustment, that is, to control the proportion which each output of the first and second detection circuits 32 and 33 contributes to the sum of these outputs, so that the gain of the intermediate frequency amplifier 17 may be reduced below the value for the case where only the output of the first detection circuit 32 is used as the gain control signal. In this case the negative feedback quantity to the amplifier 17 becomes $|1+Q(p)|_{OPT}$. In the control circuit 27, since the coherent detection circuit 32 is not an essential principle of this invention, if the slidable terminal of variable resistor 345 in the balanced type DC amplifying circuit 34 is positioned at the connecting point between the first emitter follower amplifier 341 on the side of coherent detection circuit 32 and the variable resistor 345, the coherent detection circuit 32 and the similar coherent detection circuits of the applied example described hereinafter in reference of FIGS. 4 and 5 are not necessary to the composition of this invention. In the control circuit 27 illustrated in FIG. 1, it is also possible to arrange the slidable terminal of variable resistor 345 in the balanced type DC amplifying circuit 34, so that the difference voltage of the output detected between the first and second detection circuits 32 and 33 may be obtained at said slidable terminal. In such a case, the control circuit 27 and the gain control portion of the intermediate frequency amplifier 17 must be experimentally preadjusted, so that, when the level of the received frequency modulated wave is sufficiently high, the difference voltage at the slidable terminal may become zero and the negative feedback quantity may become at least $$|1+Q(p)|_{MIN}$$

and when the negative feedback quantity decreases and the level of the received frequency modulated wave reaches the threshold level (in consequence of the decrease of the received high frequency signal level and the decrease in the signal to noise ratio) the difference voltage at the slidable terminal may decrease the gain of the intermediate frequency amplifier 17 and make the negative feedback quantity $|1+Q(p)|_{OPT}$.

In the preferred embodiment of FIG. 1, the gain of the intermediate frequency amplifier 17 is controlled and consequently the overall gain A from input terminal 11 to the phase detector 21 is controlled in order to control the negative feedback quantity of the negative feedback circuit according to the principle of this invention. This control is obtained by means of controlling (in accordance with the magnitude of the received input power level or in particular signal to noise ratio) either one or more of the following: the overall gain A; the detection sensitivity D of phase detector 21; the modulation sensitivity M of demodulation local oscillator 19; the transfer function T(*p*) of the integral circuit in splitting the local oscillator 19 equivalently into an integral circuit and a phase modulation circuit; and the gain B(*p*) of base-band amplifier 23. These factors are in Equation 8. It is possible to control the negative feedback quantity of the negative feedback circuit (up to $|1+Q(p)|_{MIN}$ in the case where the received input power level is large enough and down to $|1+Q(p)|_{OPT}$ where the received input power level reaches the threshold level) by reducing the negative feedback quantity in proportion to the decrease of the received input power level. In addition, in FIG. 1 of the preferred embodiment, the peak-value-detector is included in the control signal supply circuit so as to provide a high quality channel which meets the C.C.I.R. standards. However, it should be noted that the control signal supply circuit can contain an R.M.S. value detector instead of the peak-value detector.

Next, reference is made to FIG. 4 which illustrates another embodiment of this invention. Similar to the preferred embodiment shown in FIG. 1, FIG. 4 comprises input terminal 11 connected to input source 100; a frequency converter 15 with a local oscillator 13; an intermediate frequency amplifier 17 which supplies an amplified intermediate frequency signal $e_I$ (called simply as intermediate frequency signal) a phase detector 21 with demodulation local oscillator 19 yielding demodulation local oscillation power $e_L$. Detector 21 supplies detection output signal $e_D$. The baseband amplifier 23 produces baseband signal $e_B$, and has an output terminal 25. The second embodiment shown in FIG. 4 comprises control circuit 27′ in addition, which contains phase shifter 31 which accepts a part of the demodulation local oscillation power $e_L$ through lead 1927 and converts said part to a phase shifted local oscillation signal having almost equal phase to that of intermediate frequency signal $e_I$. A coherent detection circuit 32 is provided which is supplied with a part of intermediate frequency signal $e_I$ through lead 1727 and simultaneously with the phase-shifted local oscillation signal for coherent-detection of only the amplitude of a carrier component of the frequency modulated wave in the intermediate frequency signal $e_I$, which component has the same frequency as the carrier frequency. The DC amplifying circuit 35′ amplifies the coherent detector output signal from circuit 32. The DC-amplified coherent detector output, namely, the automatic gain adjustment output of the control circuit 27′ is supplied to the intermediate frequency amplifier 17 through lead 2717 so that the gain of the said amplifier 17 may hold the voltage of the intermediate frequency signal $e_I$ constant regardless of the magnitude of the received input power. Moreover, the second embodiment shown in FIG. 4 includes a second coherent detection circuit 32′ which is supplied with a part of the intermediate frequency signal $e_I$ and the output of phase shifter 31 in the control circuit 27′. Detector 32′ coherently-detects the ampiltudes of the carrier component of the frequency modulated wave in the intermediate frequency signal $e_I$, and the component of the same frequency as the carrier frequency. The peak-value detection circuit 33′ is supplied with a portion of the intermediate frequency signal $e_I$ and detects the peak value of the intermediate frequency signal $e_I$ which is frequency modulated by the frequency modulated wave and accompanies noise. Subtractor (combiner circuit) 61 is supplied with the outputs of the second coherent detection circuit 32′ and peak value detection circuit 33′ and produces a difference DC voltage indicative of the difference between these outputs. The DC amplifying circuit 63 supplied with the difference output amplifies the latter output into a control signal. Lead 6323 supplies said control signal to the baseband amplifier 23 so that it may control the gain $B(p)$ of the baseband amplifier 23. The variation of the gain $B(p)$ of the baseband amplifier 23 can be realized by providing the baseband amplifier 23 with an emitter grounded transistor amplifier, a variable impedance diode which is connected to the emitter of the transistor of the amplifier and whose impedance can vary in accordance with the magnitude of the voltage impressed between its electrodes, and means for varying the base current of the transistor in accordance with the control signal so that it may vary the emitter current of the transistor, and thus the impedance of the variable impedance diode. Since the DC output voltage varies in proportion to the difference of feedback quantity $|1+Q(p)|_{MIN}$ minus $|1+Q(p)|_{OPT}$ should the received input power lie between a sufficiently large value and the threshold level value, it would also be possible to vary the negative feedback quantity of the negative feedback circuit in accordance with the principle of this invention by utilizing the embodiment shown in FIG. 4. It is also possible to attain the purpose of this invention by way of providing a circuit which detects the noise power on the outside of the baseband region in the baseband signal $e_B$ obtained at the output terminal 25, instead of the second coherent detection circuit 32′, the peak-value detection circuit 33′ and subtractor 61.

FIG. 5 illustrates another embodiment of this invention. As in the embodiment of FIG. 4, an input terminal 11 is connected to receive input signal from source 100. The frequency converter 15 is accompanied by the local oscillator 13. The intermediate frequency amplifier 17 supplies an amplified intermediate frequency signal hereinafter called as intermediate frequency signal $e_I$. A phase detector 21 and the associated demodulation local oscillator 19 (which produces demodulation local oscillator power $e_L$) supply detection output signals $e_D$. The baseband amplifier 23 produces amplified baseband signal $e_B$, at the output terminal 25. The control circuit 27′ contains phase shifter 31; a first coherent detection circuit 32 and DC amplifier 35′. The output of circuit 27′ is the automatic gain control output voltage supplied to the intermediate frequency amplifier 17 for controlling the gain of said amplifier 17 to keep the voltage of signal $e_I$ constant regardless of the magnitude of the received input power. A second coherent detection circuit 32′ detects the amplitude of the carrier component of the frequency modulated wave in the intermediate frequency signal $e_I$, and the component of the same frequency as the carrier frequency. A peak-value detection circuit 33′ detects the peak value of the intermediate frequency signal $e_I$ and the accompanying noise signals. The subtractor 61 (a combiner circuit) produces a DC output representing the difference between the output of second coherent detection circuit 32′ and the output of peak-value-detection circuit 33′. The DC amplifying circuit 63 amplifies the output of circuit 61 to provide the control signal. Instead of the means for controlling the gain $B(p)$ of baseband amplifier 23 (including lead 6323 shown in FIG. 4) by the control signal, the embodiment of FIG. 5 provides means which include lead 6319 for supplying a control signal to the demodulation local oscillator 19 so that the control signal may control the modulation sensitivity M of the local oscillation 19.

Thus, according to the principle of this invention, a negative feedback phase detection receiver is provided which facilitates not only high sensitivity reception even when the input high frequency power level is very low, but also facilitates low crossstalk noise reception when the input power level is relatively high.

While we have described above the principles of our invention in connection with specific embodiments, it is to be clearly understood that this description is made only by way of example, and not as a limitation to the scope of our invention as set forth in the objects thereof and in the accompanying claims.

We claim:

1. A negative feedback receiver for an alternating current carrier signal having a preselected characteristic modulated by other alternating current signals, including:
an input supply of said other signal modulated carrier signal;
means for converting said input modulated carrier signal into an intermediate frequency signal having a characteristic modulated in correspondence with said preselected modulated characteristic of said carrier signal;
means for amplifying said intermediate frequency signal;
a local source of an alternating current signal variable in frequency relative to the frequency of said intermediate frequency signal;
means for detecting first portions of said local and amplified intermediate frequency signals to provide an output signal;
means for amplifying said output signal;
means for applying a portion of said amplified output signal in negative feedback relation to said local signal source to adjust the frequency of said local signal to follow changes in the frequency of said amplified output signal;
and means separately detecting a first group of signals including second portions of said amplified intermediate frequency signal and local signal shifted in phase by 90 degrees and a second group of signals including a third portion of said amplified intermediate frequency signal and a noise signal for generating a control signal which is fed back in negative feedback relation to control a characteristic of a preselected one of said intermediate frequency amplifying means, output signal amplifying means and local signal source, said control signal having a low value when the amplified intermediate frequency signal has a value below a predetermined level to provide high sensitivity reception in said receiver, said low value having a minimum value corresponding to a threshold level of said receiver and varying linearly and logarithmically above said minimum value to a high value, said control signal having said high value exceeding said low value when the value of the amplified intermediate frequency signal exceeds said predetermined value to provide high quality reception in said receiver.

2. A negative feedback receiver for an alternating current carrier signal phase modulated by other alternating current signals, including:

an input supply of said carrier signal phase modulated by said other signals;

means for converting said input phase modulated carrier signal into an intermediate frequency signal phase modulated in correspondence with said phase modulated carrier signal;

means for amplifying said intermediate frequency signal;

a local source of an alternating current signal variable in frequency in relation to the frequency of said intermediate frequency signal;

means for demodulating first portions of said amplified intermediate frequency signal and local signal to provide an output signal;

means for amplifying said output signal;

means for applying a portion of said amplified output signal in negative feedback relation to said local signal source to vary the frequency of said local signal to follow changes in the frequency of said amplified output signal;

means separately detecting a first group of signals including second portions of said amplified intermediate frequency signal and local signal shifted in phase by 90 degrees and a second group of signals including a noise signal and a third portion of said amplified intermediate frequency signal for generating at least one control signal, said control signal having a low value when the amplified intermediate frequency signal has a value below a predetermined level, said low value having a minimum value corresponding to a threshold level of said receiver and varying above said minimum value in accordance with the values of said amplified intermediate frequency signal and a noise signal, said control signal having a high value exceeding said low value when said amplified alternating current signal exceeds said predetermined value;

and means connecting said signal generating means to a preselected one of said intermediate frequency amplifying means, output signal amplifying means and local signal source for applying said control signal in negative feedback relation to said last-mentioned preselected one of said intermediate frequency amplifying means, output signal amplifying means and local signal source to control one of the gain of said intermediate frequency amplifying means, the gain of said output signal amplifying means and the signal frequency of said local source to provide said receiver with high sensitivity for said low value control signal and high quality reception for said high value control signal.

3. A negative feedback receiver as set forth in claim 2 wherein said preselected one of said intermediate frequency amplifying means, output signal amplifying means and local signal source comprises said intermediate frequency amplifying means, and said connecting means connects said signal generating means to said last-mentioned amplifying means to apply the control signal in negative feedback relation to said last-mentioned amplifying means to control the gain thereof.

4. A negative feedback receiver as set forth in claim 2 wherein said preselected one of said intermediate frequency amplifying means, output signal amplifying means and local signal source comprises said last-mentioned signal source, and said connecting means connects said signal generating means to said last-mentioned signal source to apply the control signal in negative feedback relation to said last-mentioned source to control the frequency of said local signal.

5. A negative feedback receiver as set forth in claim 2 wherein said preselected one of said intermediate frequency amplifying means, output signal amplifying means and local signal source comprises said output signal amplifying means, and said connecting means connects said signal generating means to said last-mentioned amplifying means to apply the control signal in negative feedback relation to said last-mentioned amplifying means to control the gain thereof.

6. A negative feedback receiver as set forth in claim 2 in which the control signal generating means includes a coherent-detector connected to receive said first group of signals including said second portions of said amplified IF signal and local signal shifted in phase by 90 degrees for coherent-detecting the amplitudes of a carrier component of the phase modulated signal contained in said amplifier IF signal and of a local signal component having a frequency equal to the frequency of said carrier component to generate a first voltage; a peak-value-detector also connected to receive said second group of signals including said third portion of said amplified IF and noise signals for detecting the peak value of the vectorial sum of the last-mentioned noise and phase modulated signals in said last-mentioned amplified IF signal to generate a second voltage; and a signal generator connected to receive the detected first and second voltage from said coherent-detector and peak-value-detector, respectively, for generating said control signal in response to said last-mentioned first and second groups of signals.

7. A negative feedback receiver as set forth in claim 6 wherein the coherent-detector includes means for generating said first voltage which is dependent only on the second portion of said amplified IF signal, excluding the noise component of said last-mentioned signal.

8. A negative feedback receiver as set forth in claim 2 in which said control signal generatnig means includes first and second parallel circuits of which circuits said first circuit is connected to receive said first and second groups of amplified intermediate frequency, local and noise signals to generate said first-mentioned one control signal and is further connected by said connecting means to said output signal amplifying means to apply said one control signal to said last-mentioned means to control the gain thereof which last-mentioned means constitutes said preselected one of said output signal amplifying means and local signal source and of which circuits said second circuit is conneted to receive a fourth portion of said amplified intermediate frequency signal and a third portion of said local signal shifted in phase by 90 degrees to generate a second control signal for controlling the gain of said intermediate frequency amplifying means.

9. A negative feedback receiver as set forth in claim 2 in which said control signal generating means includes first and second parallel circuits of which circuits said first circuit is connected to receive said first and second groups of amplified intermediate frequency local and noise signals to generate said first-mentioned one control signal and is further connected by said connecting means to apply said one control signal to said local signal source to control the frequency of said local signal and which said last-mentioned signal source constitutes said preselected one of said output signal amplifying means and local signal source and of which circuits said second circuit is connected to receive a fourth portion of said amplified intermediate frequency signal and a third portion of said local signal shifted in phase by 90 degrees to generate a second control signal for controlling the gain of said intermediate frequency amplifying means.

10. A negative feedback receiver for an alternating current carrier signal having a preselected characteristic modulated by other alternating current signals, including:

an input supply of said other signal modulated carrier signal;

means for converting said input other signal modulated carrier signal into an intermediate frequency signal having a characteristic modulated in correspondence with said modulated preselected characteristic of said last-mentioned carrier signal;

means for amplifying said intermediate frequency signal;

a local source of an alternating current signal variable in frequency relative to the frequency of said intermediate frequency signal;

means for detecting first portions of said local and amplified intermediate frequency signals to provide an output signal;

means for amplifying said output signal;

means for applying a portion of said amplified output signal in negative feedback relation to said local signal source to adjust the frequency of said local signal to follow changes in the frequency of said amplified output signal;

means for generating at least one control signal, comprising:

coherent-detector means connected to the outputs of said intermediate frequency amplifier and local signal source for receiving a first group of signals including second portions of said amplified intermediate frequency signal and local signal shifted in phase by 90 degrees to coherent detect the amplitudes of a carrier component in said amplified intermediate frequency signal and a component having a frequency the same as the frequency of said last-mentioned carrier component as contained in said last-mentioned second portions of said amplified intermediate frequency and local signals to provide a first voltage, peak-value detector means connected to the output of said intermediate frequency amplifying means for receiving a second group of signals including a third portion of said amplified intermediate frequency signal and a noise signal to detect the peak value of the vectorial sum of said last-mentioned third portion of said amplified intermediate frequency signal and a noise signal to detect the peak value of the rectorial sum of said last mentioned third portion of said amplified intermediate frequency signal and noise signal contained in said last-mentioned intermediate frequency signal to provide a second voltage, and means for combining said first and second voltages to generate said control signal;

and circuit means for applying said control signal in negative feedback relation to said intermediate frequency amplifying means to control the gain thereof to maintain the amplified intermediate frequency signal at a substantially constant value in response to changes in the value of said input modulated circuit signal.

11. A negative feedback receiver as set forth in claim 10 in which said coherent-detector for receiving said first group of signals, comprises:

a transformer having one end of a primary winding connected to the output of said intermediate frequency signal amplifying means to receive said second portion of said amplifier intermediate frequency signal and having an opposite end of said primary winding connected to ground, said transformer also having two discrete secondary windings;

two oppositely poled rectifiers having two different electrodes coupled to the output of said local signal source to receive said second portion of said local signal shifted by 90 degrees and two other different electrodes connected to two ends of said two secondary windings, each rectifier having one electrode connected to one end of each of said secondary windings;

two capacitors, each having one terminal connected to a second end of one of said secondary windings and an opposite terminal connected to ground;

two resistors, each having one terminal connected to a terminal common to one of said capacitors and one of said secondary windings, said two resistors having common second terminals;

and resistance means connected to said common second terminals of said last-mentioned two resistors and ground for providing said first voltage.

12. A negative feedback receiver as set forth in claim 10 in which said peak-value detector means for receiving said second group of signals, comprises:

two diodes having different electrodes coupled to the output of said intermediate frequency amplifying means to receive said third portion of said amplified intermediate frequency signal and noise signal therefrom, one of said two diodes having a second electrode connected to ground;

a capacitor having one terminal connected to a second electrode of the other of said two diodes and an opposite terminal connected to ground;

and a resistor having one terminal connected to ground and an opposite terminal connected to a terminal common to said capacitor and other diode for providing said second voltage thereacross.

13. A negative feedback receiver as set forth in claim 12 which includes low-pass filter means connected to said resistor opposite terminal and ground for taking off the residual higher frequency component from the output of said peak-value detector;

and variable resistance means connected to said filter means for providing said second voltage from said resistor and filter means.

14. A negative feedback receiver as set forth in claim 10 in which said voltage combining means comprises a balanced direct current amplifier including:

a first transistor connected as a first emitter follower and having a base connected to said coherent-detector means for receiving said first voltage therefrom, a collector connected to an activating voltage terminal, and an emitter;

a second transistor having a base connected to said emitter of said first transistor for receiving said first voltage therefrom, a collector connected to said activating voltage terminal, and an emitter;

a third transistor connected as a second emitter follower and having a base connected to said peak-value detector means for receiving said second voltage therefrom, a collector connected to said activating voltage terminal, and an emitter;

a fourth transistor having a base connected to said emitter of said third transistor for receiving said second voltage therefrom, a collector connected to said activating voltage terminal, and an emitter;

and variable resistance means connected to said emitters of said second and fourth transistors and ground for adding said first and second voltages received therefrom to generate said control voltage.

15. A negative feedback receiver as set forth in claim 10 in which:

said coherent-detector means for receiving said first group of signals comprises a transformer having one end of a primary winding connected to the output of said intermediate frequency signal amplifying means to receive said second portion of said amplified intermediate frequency signal and having an opposite end of said primary winding connected to ground, said transformer also having two discrete secondary windings;

two oppositely poled rectifiers having two different electrodes coupled to the output of said local signal source to receive said second portion of said local signal shifted in phase by 90 degrees and two other different electrodes connected to two ends of said two secondary windings, each rectifier having one electrode connected to one end of one of said secondary windings;

two capacitors, each having one terminal connected to a second end of one of said secondary windings and an opposite terminal to ground;

two resistors, each having one terminal connected to a terminal common to one of said capacitors and one of said secondary windings, said two resistors having common second terminals;

and resistance means connected to said common terminals of said last-mentioned two resistors and ground for providing said first voltage;

said peak-value detector for receiving said second group of signals comprises two diodes having different electrodes coupled to the output of said intermediate frequency amplifying means to receive said third portion of said amplified intermediate frequency signal and noise signal therefrom, one of said two diodes having a second electrode connected to ground;

a third capacitor having one terminal connected to a second electrode of the other of said two diodes and an opposite terminal connected to ground;

a third resistor having one terminal connected to ground and an opposite terminal connected to a terminal common to said third capacitor and other diode for providing said second voltage;

low-pass filter means connected to said third resistor opposite terminal and ground for taking off the residual higher frequency component from said third resistor;

and first variable resistance means connected to said filter means and ground for providing said second voltage;

and said voltage combining means comprises a balanced direct current amplifier including:

a first transistor connected as a first emitter follower and having a base connected to said first-mentioned resistance means of said coherent-detector means for receiving said first voltage therefrom, a collector connected to an activating voltage terminal, and an emitter, a second transistor having a base connected to said emitter of said first emitter follower for receiving said first voltage therefrom, a collector connected to said activating voltage terminal, and an emitter, a third transistor connected as a second emitter follower and having a base connected to said first variable resistance means of said peak-value detector means for receiving said second voltage therefrom, a collector connected to said activating voltage terminal, and an emitter, a fourth transistor having a base connected to said emitter of said second emitter follower transistor for receiving said second voltage therefrom, a collector connected to said activating voltage terminal, and an emitter, and second variable resistance means connected to said emitters of said second and fourth transistors and ground for adding said first and second voltages to generate said control voltage.

16. A negative feedback receiver for an alternating current carrier signal having a preselected characteristic modulated by other alternating current signals, including:

an input supply of said other signal modulated carrier signal;

means for converting said input modulated carrier signal into an intermediate frequency signal having a characteristic modulated in correspondence with said modulated preselected characteristic of said last-mentioned carrier signal;

means for amplifying said intermediate frequency signal;

a local source of an alternating current signal variable in frequency relative to the frequency of said intermediate frequency signal;

means for demodulating first portions of said local and amplified intermediate frequency signal to provide an output signal;

means for amplifying said output signal;

means for applying a portion of said amplified output signal in negative feedback relation to said local signal source to adjust the frequency of said local signal to follow changes in the frequency of said amplified output signal;

means for generating a first control signal comprising:

first coherent-detector means connected to the outputs of said intermediate frequency amplifying means and local signal source for receiving a first group of signals including second portions of said amplified intermediate frequency signal and local signal shifted in phase by 90 degrees to ceherent detect the amplitudes of a carrier component in said amplified intermediate frequency signal and a component having a frequency the same as the frequency of said last-mentioned carrier component as contained in said last-mentioned second portions of said amplified intermediate frequency and local signals to provide a first voltage, peak-value detector means connected to the output of said intermediate frequency amplifying means for receiving a second group of signals including a third portion of said amplified intermediate frequency signal and a noise signal to detect the peak-value of the vectorial sum of said last-mentioned third portion of said amplified intermediate frequency signal and noise signal as contained in said last-mentioned intermediate frequency signal to provide a second voltage, means for combining said first and second voltages to generate said first control signal, and first circuit means connecting the output of said last-mentioned voltage combining means to a preselected one of said output signal amplifying means and local signal source for applying said first control signal in negative feedback relation to said last-mentioned preselected one of said output signal amplifying means and local signal source to control one of the gain of said output signal amplifying means and the frequency of said local signal;

and means for generating a second control signal comprising:

second coherent-detector means connected to the outputs of said intermediate frequency amplifying means and local signal source for receiving a third group of signals including third portions of said amplified intermediate frequency signal and local signal shifted in phase by 90 degrees to coherent detect the amplitudes of a carrier component of said amplified intermediate frequency signal and a component having a frequency the same as the frequency of said last-mentioned carrier component as contained in said last-mentioned third portions of said amplified intermediate frequency and local signals to provide a second control signal, and second circuit means connecting the output of said last-mentioned second coherent-detector means to said intermediate frequency amplifying means for applying said second control signal in negative feedback relation to said last-mentioned amplifying means for maintaining the amplified intermediate frequency signal at a substantially constant value regardless of changes in the magnitude of said input modulated carrier signal.

17. A negative feedback receiver as set forth in claim 16 in which said preselected one of said output signal amplifying means and local signal source comprises said last-mentioned amplifying means, and said first circuit means connects the output of said voltage combining means to said last-mentioned amplifying means for applying said first control signal in negative feedback relation thereto to control the gain thereof.

18. A negative feedback receiver as set forth in claim 16 in which said preselected one of said output signal amplifying means and local signal source comprises said last-mentioned source, and said first circuit means connects the output of said voltage combining means to said last-mentioned source for applying said first control signal in negative feedback relation thereto to control the frequency of said local signal.

References Cited

UNITED STATES PATENTS

| | | | |
|---|---|---|---|
| 3,001,068 | 9/1961 | Morita et al. | 325—346 |
| 3,069,625 | 12/1962 | Morita et al. | 329—124 XR |

KATHLEEN H. CLAFFY, *Primary Examiner.*

R. S. BELL, *Assistant Examiner.*

Column 20, line 19, "ceherent" should read -- coherent --.

Signed and sealed this 7th day of July 1970.

(SEAL)
Attest:

EDWARD M. FLETCHER, JR.
Attesting Officer

WILLIAM E. SCHUYLER, JR.
Commissioner of Patents

U.S. DEPARTMENT OF COMMERCE

PATENT OFFICE

Washington, D.C. 20231

UNITED STATES PATENT OFFICE

CERTIFICATE OF CORRECTION

Patent No. 3,406,362 October 15, 1968

Eugene Revolinsky et al.

It is certified that error appears in the above identified patent and that said Letters Patent are hereby corrected as shown below:

Column 8, line 15, "7.0" should read -- $7.0^{\circ}$ --.

Signed and sealed this 3rd day of March 1970.

(SEAL)
Attest:

Edward M. Fletcher, Jr.
Attesting Officer

WILLIAM E. SCHUYLER, JR.
Commissioner of Patents